United States Patent
Fürholz et al.

(10) Patent No.: US 8,697,204 B2
(45) Date of Patent: *Apr. 15, 2014

(54) RECORDING SHEET FOR INK JET PRINTING

(75) Inventors: Urs Fürholz, Marly (CH); Vincent Ruffieux, Le Mouret (CH); Meinrad Schär, Ependes (CH)

(73) Assignee: Ilford Imaging Switzerland GmbH (CH)

( * ) Notice: Subject to any disclaimer, the term of this patent is extended or adjusted under 35 U.S.C. 154(b) by 623 days.

This patent is subject to a terminal disclaimer.

(21) Appl. No.: 12/380,636

(22) Filed: Mar. 2, 2009

(65) Prior Publication Data

US 2009/0233016 A1     Sep. 17, 2009

(30) Foreign Application Priority Data

Mar. 1, 2008   (EP) ..................................... 08152191

(51) Int. Cl.
*B41M 5/00*   (2006.01)
*B41M 5/52*   (2006.01)
*B41M 5/50*   (2006.01)

(52) U.S. Cl.
CPC ........... *B41M 5/5254* (2013.01); *B41M 5/5227* (2013.01); *B41M 5/5218* (2013.01); *B41M 5/506* (2013.01)
USPC .................................. 428/32.25; 428/32.26

(58) Field of Classification Search
CPC ............. B41M 5/5254; B41M 5/5227; B41M 5/5218; B41M 5/506
USPC .......................... 428/32.1, 32.25, 32.26, 32.36
See application file for complete search history.

(56) References Cited

U.S. PATENT DOCUMENTS

| | | | |
|---|---|---|---|
| 6,589,637 B2 | 7/2003 | Baettig et al. | |
| 6,660,347 B2 | 12/2003 | Steiger | |
| 6,773,771 B1 | 8/2004 | Ashida et al. | |
| 2002/0115773 A1* | 8/2002 | Katoh et al. | 524/413 |
| 2006/0062941 A1* | 3/2006 | Bi et al. | 428/32.34 |
| 2006/0078696 A1 | 4/2006 | Fürholz et al. | |
| 2008/0216709 A1* | 9/2008 | Steingrover et al. | 106/287.11 |

FOREIGN PATENT DOCUMENTS

| | | |
|---|---|---|
| DE | 100 20 346 A1 | 11/2000 |
| EP | 0 559 324 A1 | 9/1993 |
| EP | 0 983 867 A2 | 3/2000 |
| EP | 1 197 345 A1 | 4/2002 |
| EP | 1 231 071 A1 | 8/2002 |
| EP | 1 559 750 A2 | 8/2005 |
| EP | 1 655 348 A1 | 5/2006 |
| WO | WO 0020221 | 4/2000 |
| WO | WO 0105599 | 1/2001 |
| WO | WO 02/094573 A1 | 11/2002 |
| WO | WO 2007/050462 A2 | 5/2007 |

OTHER PUBLICATIONS

S. Brunauer, P.H. Emmett and E. Teller, "Adsorption of Gases in Multimolecular Layers", Journal of the American Chemical Society 60, 309-319 (1938).
Datasheet of Cab-O-Sil ® M-5 (Apr. 2004).
Data sheet of Cab-O-Sil® H-5 (Apr. 2004).
Datasheet of Mowiol® (Oct. 2002).

* cited by examiner

*Primary Examiner* — Betelhem Shewareged
(74) *Attorney, Agent, or Firm* — Onofrio Law; Dara L. Onofrio, Esq.

(57) ABSTRACT

A method for the preparation of silicium dioxide dispersions is provided, wherein the surface of the silicium dioxide is modified by a treatment with the reaction products, formed in a separate reaction step, of at least one compound of trivalent aluminum or of tetravalent zirconium or a mixture thereof with at least one aminoorganosilane; and the invention also relates to recording sheets for ink jet printing having such a dispersion incorporated in an ink-receiving layer.

15 Claims, No Drawings

RECORDING SHEET FOR INK JET PRINTING

FIELD OF THE INVENTION

The present invention relates to a method of preparation of silicium dioxide dispersions, wherein the surface of the silicium dioxide is modified by a reaction with the reaction products of a compound of trivalent aluminum or of tetravalent zirconium or of a mixture thereof with at least one aminoorganosilane. These reaction products are formed in a separate reaction step. Furthermore, the present invention relates to recording sheets for ink jet printing containing said dispersion in an ink-receiving layer.

BACKGROUND OF THE INVENTION

Ink jet printing processes are mainly of two types: continuous stream and drop-on-demand.

In continuous stream ink jet printing, a continuous ink stream is emitted under pressure through a nozzle. The stream breaks up into droplets at a certain distance from the nozzle. If a specific location on the recording sheet has to be printed, the individual droplets are directed to the recording sheet; otherwise, they are directed to a collecting vessel. This is done, for example, by charging unnecessary droplets in accordance with digital data signals and passing them through a static electric field, which adjusts the trajectory of these droplets in order to direct them to the collecting vessel. The inverse procedure may also be used, wherein uncharged droplets are collected in the vessel.

In the non-continuous process, or the so-called "drop-on-demand" process, a droplet is generated and expelled from the nozzle in accordance with digital data signals only in the case where a specific location on the recording sheet has to be printed.

The printing speed of modern ink jet printers is ever increasing for economic reasons. Recording sheets suitable for these printers therefore need to absorb the inks very quickly. Particularly suitable for this purpose are recording sheets containing nanoporous inorganic compounds, preferably oxides such as aluminum oxides or silicium dioxide, or oxide/hydroxides such as aluminum oxide/hydroxides. Such recording sheets are known as "nanoporous" recording sheets.

Such recording sheets available today do not meet all of the required demands. In particular, in the case where dye-based inks are used for recording, the water fastness and the diffusion fastness of images printed on these recording sheets have to be improved. In the case where pigment-based inks are used for recording, the surface gloss of images printed on these recording sheets has to be improved, because the required photo quality very often is not obtained due to an insufficient compatibility between the ink-receiving layer and the ink. Particularly disturbing are gloss differences between different parts of the image. Furthermore, the manufacturing process of the known nanoporous recording sheets is not well mastered on an industrial scale.

In many cases, unprinted recording sheets show strong yellowing during storage in cardboard boxes.

Patent application DE 10,020,346 describes a recording sheet which contains silicium dioxide prepared in the gas phase with a size of the primary particles of at most 20 nm, wherein the surface of the silicium dioxide has been modified by a treatment with polyaluminum hydroxychloride.

Patent application WO 00/20,221 describes the reaction of silicium dioxide prepared in the gas phase with aluminum chlorohydrate. The modified silicium dioxide is incorporated afterwards into an ink-receiving layer of nanoporous recording sheets for ink jet printing.

Patent application WO 02/094,573 describes the use of silicium dioxide prepared in the gas phase in recording sheets for ink jet printing, wherein the surface of the silicium dioxide has been modified by a treatment with aminoorganosilanes.

Patent application WO 01/05,599 describes the use of silicium dioxide pigments in recording sheets for ink jet printing, wherein the surface of the silicium dioxide has been modified by a treatment with cationic aminoorganosiloxanes.

Patent application EP 0,983,867 describes the use of colloidal silicium dioxide in recording sheets for ink jet printing, wherein the surface of the silicium dioxide has been modified by a treatment with silanes of general formula $(R_1)_n Si(OR_2)_{4-n}$, wherein at least one of the substituents $R_1$ contains an amino group.

Patent application EP 1,655,348 describes the use of colloidal silicium dioxide in recording sheets for ink jet printing, wherein the surface of the silicium dioxide has been modified by a treatment with the reaction products of a compound of trivalent aluminum or of tetravalent zirconium or of a mixture thereof with at least one aminoorganosilane. Claimed aminoorganosilanes are 3-aminopropyltrimethoxysilane, N-(2-aminoethyl)-3-aminopropyltrimethoxysilane, (3-triethoxysilylpropyl)-diethylenetriamine, 3-aminopropyltriethoxysilane, N-(2-aminoethyl)-3-aminopropyltriethoxysilane and (3-triethoxysilylpropyl)-diethylentriamine.

The recording sheets according to the invention show a considerable improvements of nearly all their properties in comparison to recording sheets representing the state of the art, wherein the surface of the silicium dioxide has been modified by a treatment with aluminum chlorohydrate or an aminoorganosilane.

SUMMARY OF THE INVENTION

An objective of the invention is to provide nanoporous recording sheets with improved image quality (volume of color space), improved water fastness and improved diffusion fastness of recording sheets printed with dye-based inks.

A further objective of the invention is to provide nanoporous recording sheets with lowered gloss differences between different parts of the image having different colors and densities, of recording sheets printed with pigment-based inks.

A further objective of the invention is an improved manufacturability and an improved storage behavior of the dispersions according to the invention, wherein the surface of the silicium dioxide has been modified with the reaction products of at least one compound of trivalent aluminum or of tetravalent zirconium or of a mixture thereof with at least one aminoorganosilane according to claim 1, an improved manufacturability and an improved storage stability of the coating solutions and an improved coating quality of the recording sheets according to the invention.

A very important objective of the invention is the preparation of recording sheets that do not show yellowing in the unprinted state during storage in cardboard boxes.

Such a recording sheet consists of a support having coated thereon at least one ink-receiving layer containing nanoporous, surface modified silicium dioxide.

We have now surprisingly found that all these improvements may be obtained with dispersions of silicium dioxide wherein the surface has been modified by a treatment with the reaction products of at least one compound of trivalent aluminum or of tetravalent zirconium or of a mixture thereof with at least one aminoorganosilane according to claim 1.

The recording sheets for ink jet printing according to the invention contain, in addition to the modified nanoporous, surface modified silicium dioxide, one or more binders.

DETAILED DESCRIPTION OF THE INVENTION

We have surprisingly found that a nanoporous recording sheet for ink jet printing, containing in its ink-receiving layer a dispersion of silicium dioxide, wherein the surface of the silicium dioxide has been modified by a treatment with the reaction products of at least one compound of trivalent aluminum (such as aluminum chlorohydrate) or of tetravalent zirconium (such as zirconyl chloride $ZrOCl_2$) or of a mixture thereof with at least one aminoorganosilane according to claim 1, does not show yellowing in the unprinted state during storage in cardboard boxes.

The nanoporous synthetic silicium dioxide used in the recording sheets according to the invention may be prepared either by precipitation in a wet process (precipitated silicium dioxide) or in a gas phase reaction (fumed silicium dioxide).

Precipitated silicium dioxide may be prepared for example in the wet process by metathesis of sodium silicate with an acid or by passing through a layer of ion-exchange resin as silicium dioxide sol, by heating and maturing of this silicium dioxide sol or by gelling of a silicium dioxide sol.

The gas phase reaction for the preparation of fumed silicium dioxide by flame pyrolysis is also known as a dry process in contrast to the wet process. In this process, for example, silicium tetrachloride is reacted in the presence of hydrogen and oxygen under formation of silicium dioxide and hydrochloric acid. Silanes, such as for example methyltrichlorosilane or trichlorosilane, may be used in this process in place of silicium tetrachloride or in combination with silicium tetrachloride.

Preferably, fumed silicium dioxide is used in the recording sheets according to the invention.

Fumed silicium dioxide consists of aggregates of small primary particles. These primary particles themselves are not porous. The aggregates, however, are porous and may absorb for this reason rapidly big amounts of liquids.

The aggregates of fumed silicium dioxide normally have a size (mean diameter) of more than 100 nm. Particles having a size from 100 nm to 500 nm are preferred, particularly preferred are particles having a size from 150 nm to 250 nm. These sizes refer to the aggregates. The primary particles have a size from 1 nm to 100 nm. A size from 1 nm to 30 nm is preferred, particularly preferred is a size from 5 nm to 15 nm.

Fumed silicium dioxide has a specific surface area from 20 $m^2/g$ to 400 $m^2/g$. A specific surface area from 40 $m^2/g$ to 400 $m^2/g$ is preferred. Particularly preferred is a specific surface area from 90 $m^2/g$ to 330 $m^2/g$. The specific surface area is determined by the BET isotherm method, as described by S. Brunauer, P. H. Emmet and I. Teller in "Adsorption of Gases in Multimolecular Layers", Journal of the American Chemical Society 60, 309 (1938).

In the preparation method of the surface modified silicium dioxide according to the invention, which will be incorporated into the recording sheets according to the invention, fumed silicium dioxide is for example added at high shear rates to a mainly aqueous solution containing the reaction products of at least one compound of trivalent aluminum (such as aluminum chlorohydrate) or of tetravalent zirconium (such as zirconyl chloride) or of a mixture thereof with at least one aminoorganosilane according to claim 1. Under suitable conditions, a dispersion of surface modified fumed silicium dioxide is obtained that does not coagulate. The mixture containing the reaction products of at least one compound of trivalent aluminum (such as aluminum chlorohydrate) or of tetravalent zirconium (such as zirconyl chloride) or of a mixture thereof with at least one aminoorganosilane according to claim 1 shows a high buffer capacity. The alkaline aminoorganosilane neutralizes the hydrochloric acid generated during the hydrolysis of the compound of trivalent aluminum (such as aluminum chlorohydrate) or of tetravalent zirconium (such as zirconyl chloride).

Suitable devices for the preparation of the surface modified dispersions are the conventional dispersing equipments Nanomizer®, Ultimizer®, Manton-Gaulin®, Ystral Conti®, Dyno-Mill® and the like. The mentioned equipments may be used alone or in a combination of two or more of these devices.

Dispersion preparation in two steps is preferred, wherein, in the first step, a high-pressure homogenizer such as, for example, Manton-Gaulin® or Nanomizer®, is used. Afterwards, the dispersion is treated in a ball mill such as, for example, Dyno-Mill®. The balls used in the ball mill are preferably made from zirconium dioxide.

Deionized water is preferably used for the preparation of the mainly aqueous solutions. Water-miscible solvents such as lower alcohols (methanol, ethanol, propanol and the like) or ketones such as acetone may be added.

The reaction products, used in the modification step, of a compound of trivalent aluminum (such as aluminum chlorohydrate) or of tetravalent zirconium (such as zirconyl chloride) or of a mixture thereof with at least one aminoorganosilane according to claim 1 may be prepared by the addition of the aminoorganosilane to an aqueous solution of the compound of trivalent aluminum (such as aluminum chlorohydrate) or of tetravalent zirconium (such as zirconyl chloride) or of a mixture thereof or vice versa. In place of the compounds of trivalent aluminum and/or tetravalent zirconium, complex compounds containing trivalent aluminum and tetravalent zirconium (for example aluminum zirconium octachlorohydrate) or a mixture of different aluminum and/or zirconium and/or complex compounds containing aluminum and zirconium may be used for surface modification. The reaction of the compound of trivalent aluminum or of tetravalent zirconium or of a mixture thereof with the aminoorganosilane according to claim 1 is carried out at temperatures from 10° C. to 50° C. for 5 minutes to 60 minutes. The reaction is preferably carried out at room temperature for 10 minutes to 15 minutes.

For the preparation of the surface modified silicium dioxide according to the invention, the reaction products of a compound of trivalent aluminum (such as aluminum chlorohydrate) or of tetravalent zirconium (such as zirconyl chloride) or of a mixture thereof with at least one aminoorganosilane according to claim 1 may also be added, for example, to an aqueous dispersion of silicium dioxide.

Fumed silicium dioxide is particularly preferred for the surface modification with the reaction products of a compound of trivalent aluminum (such as aluminum chlorohydrate) or of tetravalent zirconium (such as zirconyl chloride) or of a mixture thereof with at least one aminoorganosilane according to claim 1.

In place of a single fumed silicium dioxide powder, a mixture of different silicium dioxide powders having different sizes of the primary particles may be used. The modification step with the reaction products of a compound of trivalent aluminum (such as aluminum chlorohydrate) or of tetravalent zirconium (such as zirconyl chloride) or of a mixture thereof with at least one aminoorganosilane according to claim 1 may be carried out individually for each silicon dioxide powder or simultaneously with the mixture of the different silicon dioxide powders.

Preferred compounds of trivalent aluminum are aluminum chloride, aluminum nitrate, aluminum acetate, aluminum formiate, aluminum lactate and aluminum chlorohydrate.

A preferred zirconium compound is zirconyl chloride ($ZrOCl_2 \cdot 8H_2O$).

Suitable aminoorganosilanes are aminoorganosilanes of formula (I)

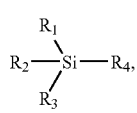

(I)

wherein
$R_1$, $R_2$, $R_3$ independently represent hydrogen, hydroxyl, unsubstituted or substituted alkyl having from 1 to 6 carbon atoms, unsubstituted or substituted aryl, unsubstituted or substituted alkoxyl having from 1 to 6 carbon atoms or unsubstituted or substituted aryloxyl;
$R_4$ represents an organic moiety substituted by at least one primary, secondary or tertiary amino group.
and
a layer of 1 cm thickness of an aqueous solution, prepared at room temperature, of 0.01 moles of aluminum chlorohydrate, 0.02/k moles of aminoorganosilane or a mixture of aminoorganosilanes, 0.01 moles of hydrochloric acid and 0.02 moles of glyoxal, having a final weight of 200 g, and stored for 24 hours at room temperature, shows an absorption increase of less than 0.05 at a wavelength of 400 nm after storage, wherein k is the number of amino groups of the aminoorganosilane or a mean value of the numbers of amino groups of the individual aminoorganosilanes in the mixture of aminoorganosilanes.

In the case where $R_1$, $R_2$ and $R_3$ are substituted, the substituents are independently selected from the group consisting of thiol, sulfide and polyalkylene oxide. Suitably selected substituents facilitate the surface modification of silicium dioxide (improved rheological behavior of the dispersions and of the coating solutions) and improve properties of the recording sheets such as stability against air pollutants, light fastness and physical properties.

Condensation products of the aminoorganosilanes may also be used in place of the monomeric aminoorganosilanes. The condensation reactions may occur between identical or different aminoorganosilanes.

Particularly suitable aminoorganosilanes are N-(n-butyl)-aminopropyltrimethoxysilane (CAS number 31024-56-3), N-(ethyl)aminoisobutyltrimethoxysilane (CAS number 227085-51-0), N-(cyclohexyl)aminomethyltriethoxysilane (CAS number 26495-91-0) and their mixtures.

The dispersion of the surface modified silicon dioxide according to the invention is advantageously used directly for the preparation of the coating solution of an ink-receiving layer of a recording sheet for ink jet printing. Therefore, the dispersion has to be stable for at least 24 hours without sedimentation of the surface modified silicon dioxide and is not allowed to change its viscosity considerably. In particular, it is not allowed to gel or to coagulate.

The dispersion contains the surface modified silicon dioxide according to the invention in an amount of from 5 percent by weight to 50 percent by weight relative to the total weight of the dispersion. Amounts of from 10 percent by weight to 30 percent by weight are preferred, particularly preferred are amounts of from 15 percent by weight to 25 percent by weight.

The surface modification of the silicon dioxide with the reaction products of at lest one compound of trivalent aluminum (such as aluminum chlorohydrate) or of tetravalent zirconium (such as zirconyl chloride) or of a mixture thereof with at least one aminoorganosilane according to claim 1 leads to a positive surface charge of the silicon dioxide. The coloring compounds (dyes or pigments) contained in inks for ink jet printing very often contain groups which may be ionized, such as $SO_3H$, COOH, $PO_3H_2$ and the like, increasing the solubility of the dyes and improving the dispersion properties of the pigments. After the dissociation of these groups, the dyes are therefore negatively charged in the mainly aqueous ink liquid and are therefore electrostatically attracted and fixed by the positive charge at the surface of the modified silicon dioxide.

The composition of the reaction mixture is determined by the desired value of pH and the desired amount of cationization as characterized by the surface charge. These two factors are influenced by the properties of the aluminum and/or zirconium compound (acidity, buffer capacity) and the properties of the aminoorganosilane (basicity, buffer capacity) and their molecular weights.

The amount of the compounds of trivalent aluminum or of tetravalent zirconium or of the mixture thereof typically is between 0.1 percent by weight and 20 percent by weight relative to the amount of the silicon dioxide. A value between 0.5 percent by weight and 10 percent by weight is preferred.

The total amount of the aminoorganosilane, respectively the mixture of aminoorganosilanes, typically is between 0.1 percent by weight and 10 percent by weight relative to the amount of the silicon dioxide. A value between 0.5 percent by weight and 10 percent by weight is preferred.

The weight ratio between the compound of trivalent aluminum (such as aluminum chlorohydrate) or of tetravalent zirconium (such as zirconyl chloride) or of a mixture thereof and the specified aminoorganosilanes is preferably chosen in such a way that the desired value of pH be attained when the components of the two reagents are mixed. A molar ratio from 0.1 to 2.0 is preferred. Particularly preferred is a molar ratio from 0.5 to 1.5, taking into account the number of aluminum or zirconium atoms and the number k of amino groups of the aminoorganosilane or a mean value of the numbers of amino groups of the individual aminoorganosilanes in the mixture of aminoorganosilanes.

The value of pH of the mixture containing the reaction products is determined mainly by the acidity of the aluminum or zirconium compound and the ratio of the number of aluminum or zirconium ions to the total number of amino groups. The substituent $R_4$ of the aminoorganosilane may be chosen with this aspect in mind.

The value of pH of the solution containing the reaction products of the compound of trivalent aluminum or of tetravalent zirconium or of a mixture thereof with the aminoorganosilane is preferably chosen to be between 3 and 10.

The value of pH of the dispersion may be lowered by the addition of inorganic or organic acids, such as, for example, acetic acid, or increased by the addition of alkaline inorganic or organic compounds, such as, for example, sodium carbonate. The acid or basic compounds may be added to the mixture containing the reaction products of the compound of trivalent aluminum and/or tetravalent zirconium or a mixture thereof with the aminoorganosilane, or they may be added after the addition of the fumed silicium dioxide.

The ratio between the number of silicium atoms and the number of aluminum and/or zirconium atoms is important in relation to the structure of the formed reaction products.

The recording sheet may contain, in addition to the surface modified silicium dioxide according to the invention, other, porous or non-porous, inorganic compounds.

In order to improve the stability of images in polluted air, the recording sheet according to the invention may contain, in addition to the surface modified silicium oxide, salts of monovalent copper such as copper(I) chloride, copper(I) bromide or copper(I) sulfite monohydrate as described in patent application EP 1,231,071.

In order to further improve the stability of images in polluted air, the recording sheet may contain, in addition to the salts of monovalent copper, diketo compounds as described in patent application EP 1,197,345.

In order to improve still further the stability of images in polluted air, the recording sheet may contain in addition organic sulfur compounds such as thiodiethylene glycol.

The binders are in most cases water-soluble polymers. Particularly preferred are film-forming polymers.

The water-soluble polymers include for example natural polymers or modified products thereof such as albumin, gelatine, casein, starch, gum arabicum, sodium or potassium alginate, hydroxyethyl cellulose, carboxymethyl cellulose, α-, β- or γ-cyclodextrine and the like. In the case where one of the water-soluble polymers is gelatin, all known types of gelatin may be used as for example acid pigskin or limed bone gelatin, acid or base hydrolysed gelatine, but also derivatised gelatins like for instance phthalaoylated, acetylated or carbamoylated gelatin or gelatin derivatized with the anhydride of trimellitic acid.

Synthetic binders may also be used and include for example polyvinyl alcohol, polyvinyl pyrrolidone, completely or partially saponified products of copolymers of vinyl acetate with other monomers; homopolymers or copolymers of unsaturated carboxylic acids such as maleic acid, (meth)acrylic acid or crotonic acid and the like; homopolymers or copolymers of sulfonated vinyl monomers such as vinylsulfonic acid, styrene sulfonic acid and the like. Furthermore, homopolymers or copolymers of vinyl monomers of (meth)acrylamide; homopolymers or copolymers of other monomers with ethylene oxide; polyurethanes; polyacrylamides; water-soluble nylon type polymers; polyesters; polyvinyl lactams; acrylamide polymers; substituted polyvinyl alcohol; polyvinyl acetals; polymers of alkyl and sulfoalkyl acrylates and methacrylates; hydrolyzed polyvinyl acetates; polyamides; polyvinyl pyridines; polyacrylic acid; copolymers with maleic anhydride; polyalkylene oxides; copolymers with methacrylamide and copolymers with maleic acid may be used. All these polymers may also be used as mixtures.

Cationic polymers or mordants may also be used, such as, for example, polyallyl amines, polyethylene imine, polyvinyl alcohol substituted by amino groups or polyurethanes substituted by amino groups.

Preferred synthetic binders are polyvinyl alcohol and polyvinyl pyrrolidone or mixtures thereof.

These polymers may be blended with water insoluble natural or synthetic high molecular weight compounds, particularly with acrylate latices or with styrene acrylate latices.

Although not specifically claimed in this invention, water insoluble polymers are nevertheless considered part of the system.

The polymers mentioned above having groups with the possibility to react with a cross-linking agent may be cross-linked or hardened to form essentially water insoluble layers. Such cross-linking bonds may be either covalent or ionic. Cross-linking or hardening of the layers allows for the modification of the physical properties of the layers, like for instance their liquid absorption capacity or their resistance against layer damage.

The cross-linking agents or hardeners are selected depending on the type of the water-soluble polymers to be cross-linked.

Organic cross-linking agents and hardeners include for example aldehydes (such as formaldehyde, glyoxal or glutaraldehyde), N-methylol compounds (such as dimethylol urea or methylol dimethylhydantoin), dioxanes (such as 2,3-dihydroxydioxane), reactive vinyl compounds (such as 1,3,5-trisacrylolyl hexahydro-s-triazine or bis-(vinylsulfonyl) ethyl ether), reactive halogen compounds (such as 2,4-dichloro-6-hydroxy-s-triazine); epoxides; aziridines; carbamoyl pyridinium compounds or mixtures of two or more of the above mentioned cross-linking agents.

Inorganic cross-linking agents or hardeners include for example chromium alum, aluminum alum or, preferably, boric acid.

The layers may also contain reactive substances that cross-link the layers under the influence of ultraviolet light, electron beams, X-rays or heat.

The layers may further be modified by the addition of fillers. Possible fillers are for example kaolin, calcium or barium carbonates, silicium dioxide, titanium dioxide, bentonites, zeolites, aluminum silicate or calcium silicate. Organic inert particles such as polymer beads may also be used. These beads may consist of polyacrylates, polyacrylamides, polystyrene or different copolymers of acrylates and styrene. The fillers are selected according to the intended use of the printed images. Some of these compounds cannot be used in the case where the printed images are to be used as transparencies. However, they are of interest in cases where the printed images are to be used as remission pictures. Very often, the introduction of such fillers causes a wanted matte surface.

The recording sheets according to the invention comprise a support having coated thereon at least one ink-receiving layer, and, optionally, auxiliary layers.

Advantageously, a gloss-improving layer, containing small pigment particles, such as, for example, colloidal silicium dioxide, colloidal aluminum oxide, colloidal aluminum oxide/hydroxide or organic pigments having a mean particle diameter up to 200 nm, is coated onto the ink-receiving layer. Up to 5 g/m$^2$ of this gloss-improving layer, preferably up to 3 g/m$^2$, are coated onto the ink-receiving layer. This gloss-improving layer may additionally contain a small amount of larger pigment particles having a size of at least 1 µm in order to improve the passage through an ink jet printer. Inorganic or organic pigments may be used as pigment particles having a size of at least 1 µm. Organic particles, in particular particles of polystyrene, are particularly preferred, because they do not reduce the gloss of the recording sheet.

A wide variety of supports are known and commonly used in the art. They include all those supports used in the manufacture of photographic materials. This includes clear films made from cellulose esters such as cellulose triacetate, cellulose acetate, cellulose propionate or cellulose acetate/butyrate, polyesters such as polyethylene terephthalate or polyethylene naphthalate, polyamides, polycarbonates, polyimides, polyolefins, polyvinyl acetals, polyethers, polyvinyl chloride and polyvinylsulfones. Polyester film supports, and especially polyethylene terephthalate or polyethylene naphthalate, are preferred because of their excellent dimensional stability characteristics. The usual opaque supports used in the manufacture of photographic materials may be used, including for example baryta paper, polyolefin coated papers or voided polyester as for example Melinex® manufactured by DuPont. Especially preferred are polyolefin coated papers or voided polyester.

When such supports, in particular polyester, are used, a subbing layer is advantageously coated first to improve the bonding of the ink-receiving layers to the support. Useful subbing layers for this purpose are well known in the photographic industry and include for example terpolymers of vinylidene chloride, acrylonitrile and acrylic acid or of vinylidene chloride, methyl acrylate and itaconic acid. In place of the use of a subbing layer, or in addition to the subbing layer, the surface of the support may be subjected to a corona-discharge treatment before the coating process.

Uncoated papers, comprising all different types of papers, varying widely in their composition and in their properties, and pigmented papers and cast-coated papers may also be used, as well as metal foils, such as foils made from aluminum.

The layers may also be coated onto textile fibre materials consisting, for example, of polyamides, polyesters, cotton, viscose and wool.

The ink-receiving layers according to the invention are in general coated from aqueous solutions or dispersions containing all necessary ingredients. In many cases, wetting agents are added to those coating solutions in order to improve the coating behavior and the evenness of the layers. Besides being necessary for coating purposes, these compounds may have an influence on the image quality and may therefore be selected with this specific objective in mind. Particularly preferred are wetting agents having a HLB (hydrophylic-lipophilic balance) value from 9 to 13. Although not specifically claimed in this invention, wetting agents nevertheless form an important part of the invention.

In addition to the above-mentioned ingredients, recording sheets according to the invention may contain additional compounds aimed at further improving their performance, as for example brightening agents to improve the whiteness. Particularly preferred optical brighteners are such as stilbenes, coumarines, triazines and oxazoles.

Light stability may be improved by adding UV absorbers such as 2-hydroxybenzotriazoles, 2-hydroxybenzophenones, derivatives of triazine or derivatives of cinnamic acid. The amount of UV absorber may vary from 200 mg/m$^2$ to 2000 mg/m$^2$, preferably from 400 mg/m$^2$ to 1000 mg/m$^2$. The UV absorber may be added to any of the layers of the recording sheet according to the invention. It is preferred that, however, if it is added, it should be added to the topmost layer.

It is further known that images produced by ink jet printing may be protected from degradation by the addition of radical scavengers, stabilisers, reducing agents and antioxidants. Examples of such compounds are sterically hindered phenols, sterically hindered amines, chromanols, ascorbic acid, phosphinic acids and their derivatives, sulfur containing compounds such as sulfides, mercaptans, thiocyanates, thioamides or thioureas.

The above-mentioned compounds may be added to the coating solutions as aqueous solutions. In the case where these compounds are not sufficiently water-soluble, they may be incorporated into the coating solutions by other common techniques known in the art. The compounds may for example be dissolved in a water-miscible solvent such as lower alcohols, glycols, ketones, esters, or amides. Alternatively, the compounds may be added to the coating solutions as fine dispersions, as oil emulsions, as cyclodextrine inclusion compounds or incorporated into latex particles.

Typically, the recording sheet according to the invention has a thickness in the range from 0.5 µm to 100 µm in the dry state, preferably in the range from 5 µm to 50 µm.

The coating solutions may be coated onto the support by any number of suitable procedures. Usual coating methods include for example extrusion coating, air knife coating, doctor blade coating, cascade coating and curtain coating. The coating solutions may also be applied using spray techniques. The ink-receiving layers may be built up from several individual layers that can be coated one after the other or simultaneously.

The individual ink-receiving layers may be different in respect to the used fumed silicium dioxide (in particular its specific surface), the modification with the reaction products of a compound of trivalent aluminum or of tetravalent zirconium or of a mixture thereof with at least one aminoorganosilane, the ratio between the binders and the silicium dioxide and the amount of hardener.

It is likewise possible to coat a support on both sides with ink-receiving layers. It is also possible to coat an antistatic layer or an anticurl layer on the backside. The selected coating method however is not to be considered limiting for the present invention.

Inks for ink jet printing consist in essence of a liquid vehicle and a dye or pigment dissolved or suspended therein. The liquid vehicle for ink jet inks consists in general of water or a mixture of water and a water-miscible organic solvent such as ethylene glycol, higher molecular weight glycols, glycerol, dipropylene glycol, polyethylene glycol, amides, polyvinyl pyrrolidone, N-methylpyrrolidone, cyclohexyl pyrrolidone, carboxylic acids and their esters, ethers, alcohols, organic sulfides, sulfolane, dimethylformamide, dimethylsulfoxide, cellosolve, polyurethanes and acrylates.

The non-aqueous parts of the ink generally serve as humefactants, cosolvents, viscosity regulating agents, ink penetration additives or drying agents. The organic compounds have in most cases a boiling point, which is higher than that of water. In addition, aqueous inks used for printers of the continuous stream type may contain inorganic or organic salts to increase their conductivity. Examples of such salts are nitrates, chlorides, phosphates and water-soluble salts of water-soluble organic acids such as acetates, oxalates and citrates. The dyes and pigments suitable for the preparation of inks useable with the recording sheets according to the invention cover practically all classes of known coloring compounds. Dyes or pigments typically used for this purpose are described in patent application EP 0,559,324. The recording sheets according to the invention are meant to be used in conjunction with most of the inks representing the state of the art.

The inks may further contain other additives such as surfactants, optical brighteners, UV absorbers, light stabilizers, biocides, precipitating agents such as multivalent metal compounds and polymeric additives.

This description of inks is for illustration only and is not to be considered as limiting for the purpose of the invention.

The present invention will be illustrated in more detail by the following examples without limiting the scope of the invention in any way.

Test Methods

1. Yellowing in the Liquid Phase 2.2 g of aluminum chlorohydrate (Locron® P, available from Clariant AG, Muttenz, Switzerland) (0.01 moles) are dissolved under vigorous stirring in 170 ml of water. 5 minutes afterwards, 0.02/k moles of the aminoorganosilane or a mixture of aminoorganosilanes are added, wherein k is the number of amino groups of the aminoorganosilane or a mean value of the numbers of amino groups of the individual aminoorganosilanes in the mixture of aminoorganosilanes. A further 5 minutes later, 10.2 g of 1N hydrochloric acid (0.01 moles) are added and, subsequently, 11.6 g of an aqueous solution (10%) of glyoxal (available from Fluka AG, Buchs, Switzerland) and the final weight is adjusted to 200 g with demineralized water. The absorption of the solution is immediately measured with a spectrophotometer Varian Cary100 Bio (available from Varian AG, Steinhausen, Switzerland) in a layer thickness of 1 cm at a wavelength of 400 nm. The absorption is re-measured after 24 hours of storage at room temperature. The difference of the two measurements describes the extent of yellowing in the liquid state.

2. Box Yellowing

Since yellowing of the unprinted recording sheets is only noticeable after a long time, the following accelerated test is done in order to get reliable results in a reasonable period.

Pieces of 2 cm×10 cm of the recording sheets to be tested are stacked and put in a white cardboard box PrintPac (ILFORD article number 116,194) of size 21.5 cm×30.5 cm×1.5 cm.

On top of this stack of pieces of the recording sheets is placed a 1.3 cm stack of densely packed pieces of the same cardboard as used in the cardboard boxes. The closed box is sealed in a composite-layer film having a thin aluminum layer inside, and stored for 5 days at the temperature of 60° C. in a Salvis drying cupboard.

At the end of the storage period, the L*a*b* values of the samples are determined with a Spectrolino spectrometer, available from Gretag-Macbeth, Regensdorf, Switzerland, and compared with the values before storage. The difference $\Delta b^*$ of the b* value describes the extent of yellowing of the recording sheet during storage in the drying cupboard.

Examples 1 to 11 and Comparative Examples C-1 to C-8

The amounts and the nature of the used compounds of trivalent aluminum, of tetravalent zirconium or of a mixture thereof, of the aminoorganosilane or the mixture of aminoorganosilanes and of the fumed silicium dioxide (Cab-o-Sil®, available from Cabot Corporation, Billerica, USA) are listed in Table 1 for examples 1 to 11.

The amounts and the nature of the used compounds of trivalent aluminum, of tetravalent zirconium or of a mixture thereof, of the aminoorganosilane or the mixture of aminoorganosilanes and of the fumed silicium dioxide are listed in Table 2 for comparative examples C-1 to C-8.

Dispersion

The compounds of trivalent aluminum, of tetravalent zirconium or of a mixture thereof were dissolved at a temperature of 20° C. in 700 g of demineralized water. The aminoorganosilane or the mixture of aminoorganosilane was the added under vigorous stirring. After a reaction time of 15 minutes (formation of the reaction products from the compound of trivalent aluminum or of tetravalent zirconium with the aminoorganosilane), 200 g of fumed silicium dioxide were added in small amounts under vigorous stirring at high shear rates. Then, the dispersion was stirred with a rotor-stator-mixer for 15 minutes. Afterwards the dispersion was heated to a temperature of 50° C. and kept for one hour at this temperature in order to modify the surface of the silicium dioxide. Finally, the dispersion was cooled down to room temperature and the weight was adjusted to 1000 g with demineralized water.

Coating Solution 0.92 g of solid boric acid was dissolved in 120 g of the above dispersion. 66 g of an aqueous solution (8%) of polyvinyl alcohol (available as Mowiol 4088 from Clariant AG, Muttenz, Switzerland) were heated a temperature of 45° C. and 0.8 g of an aqueous solution (5.23%) of the wetting agent Olin 10G (available from Arch Chemicals, Norwalk, USA) were added. Then, the dispersion containing the boric was added under moderate stirring to the above solution of polyvinyl alcohol and the final weight was adjusted to 200 g with demineralized water.

Coating 140 g/m² of this coating solution were coated at a temperature of 45° C. with a bar coater onto a polyethylene coated paper support. The coated support was then dried for 60 minutes at a temperature of 35° C. 1 m² of the coated dried recording sheet contains 16.8 g of non-modified fumed silicium dioxide.

TABLE 1

| | | Aluminum or zirconium compound | | Aminoorganosilane | |
|---|---|---|---|---|---|
| Example | Cab-o-Sil | Nature | Amount (g) | Nature | Amount (g) |
| 1 | M5 | Aluminum chlorohydrate | 13.88 | N-(n-butyl)-aminopropyltrimethoxysilane | 23.51 |
| 2 | M5 | Aluminum chlorohydrate | 13.88 | N-(ethyl)-aminoisobutyltrimethoxysilane | 22.17 |
| 3 | M5 | Aluminum chlorohydrate | 13.88 | N-(cyclohexyl)-aminomethyltriethoxysilane | 27.51 |
| 4 | M5 | Aluminum chlorohydrate | 13.88 | N-(ethyl)-aminoisobutyltrimethoxysilane | 11.09 |
| | | | | N-(n-butyl)-aminopropyltrimethoxysilane | 11.75 |
| 5 | M5 | $AlCl_3 \cdot 6H_2O$ | 4.02 | N-(n-butyl)-aminopropyltrimethoxysilane | 23.51 |
| 6 | M5 | $Al(NO_3)_3 \cdot 9H_2O$ | 8.37 | N-(n-butyl)-aminopropyltrimethoxysilane | 23.51 |
| 7 | M5 | $Al(HCOO)_3$ | 5.39 | N-(n-butyl)-aminopropyltrimethoxysilane | 23.51 |
| 8 | M5 | $Al(CH_3CH(OH)COO)_3$ | 6.86 | N-(n-butyl)-aminopropyltrimethoxysilane | 23.51 |
| 9 | H5 | Aluminum chlorohydrate | 13.88 | N-(n-butyl)-aminopropyltrimethoxysilane | 23.51 |
| 10 | M5 | $ZrOCl_2 \cdot 8H_2O$ | 11.80 | N-(n-butyl)-aminopropyltrimethoxysilane | 23.51 |
| 11 | M5 | Aluminum chlorohydrate | 6.58 | N-(n-butyl)-aminopropyltrimethoxysilane | 23.51 |
| | | $ZrOCl_2 \cdot 8H_2O$ | 6.22 | | |

TABLE 2

| Comparative example | Cab-o-Sil | Aluminum or zirconium compound | | Aminoorganosilane | |
|---|---|---|---|---|---|
| | | Nature | Amount (g) | Nature | Amount (g) |
| C-1 | M5 | Aluminum chlorohydrate | 13.88 | N-(2-aminoethyl)-3-aminopropyltrimethoxysilane | 11.10 |
| C-2 | M5 | $AlCl_3 \cdot 6H_2O$ | 4.02 | N-(2-aminoethyl)-3-aminopropyltrimethoxysilane | 11.10 |
| C-3 | M5 | $Al(NO_3)_3 \cdot 9H_2O$ | 5.49 | N-(2-aminoethyl)-3-aminopropyltrimethoxysilane | 11.10 |
| C-4 | M5 | $Al(HCOO)_3$ | 3.40 | N-(2-aminoethyl)-3-aminopropyltrimethoxysilane | 11.10 |
| C-5 | M5 | $Al(CH_3CH(OH)COO)_3$ | 6.17 | N-(2-aminoethyl)-3-aminopropyltrimethoxysilane | 11.10 |
| C-6 | H5 | Aluminum chlorohydrate | 13.88 | N-(2-aminoethyl)-3-aminopropyltrimethoxysilane | 11.10 |
| C-7 | M5 | $ZrOCl_2 \cdot 8H_2O$ | 9.65 | N-(2-aminoethyl)-3-aminopropyltrimethoxysilane | 11.10 |
| C-8 | M5 | Aluminum chlorohydrate $ZrOCl_2 \cdot 8H_2O$ | 5.48 4.08 | N-(2-aminoethyl)-3-aminopropyltrimethoxysilane | 11.10 |

Results

The results of the measurements of yellowing in the liquid phase are listed in Table 3.

TABLE 3

| Aminoorganosilane | Increase of Absorption |
|---|---|
| N-(2-aminoethyl)-3-aminopropyltrimethoxysilane | 1.38 |
| 3-Aminopropyltriethoxysilane | 0.20 |
| N-(n-butyl)-aminopropyltrimethoxysilane | 0.00 |
| N-(ethyl)-aminoisobutyltrimethoxysilane | 0.00 |
| N-(cyclohexyl)-aminomethyltriethoxysilane | 0.00 |

A comparison of the results in Table 3 immediately shows that the explicitly claimed aminoorganosilanes N-(2-aminoethyl)-3-aminopropyltrimethoxysilane and 3-aminopropyltriethoxysilane of patent application EP 1,655,348 show a strong increase of absorption in the liquid phase, whereas the explicitly claimed aminoorganosilanes N-(n-butyl)-aminopropyltrimethoxysilane, N-(ethyl)aminoisobutyltrimethoxysilane and N-(cyclohexyl)-aminomethyltriethoxysilane of the present patent application do not show an increase of absorption.

The results for box yellowing are listed in Table 4.

The results are grouped according to the used compound of trivalent aluminum or tetravalent zirconium or of the mixture thereof.

TABLE 4

| Example | Aminoorganosilane | Δb* |
|---|---|---|
| 1 | N-(n-butyl)-aminopropyltrimethoxysilane | 1.52 |
| 2 | N-(ethyl)-aminoisobutyltrimethoxysilane | 1.45 |
| 3 | N-(cyclohexyl)-aminomethyltriethoxysilane | 1.06 |
| 4 | N-(ethyl)-aminoisobutyltrimethoxysilane N-(n-butyl)-aminopropyltrimethoxysilane | 1.24 |
| C - 1 | N-(2-aminoethyl)-3-aminopropyltrimethoxysilane | 10.15 |
| 5 | N-(n-butyl)-aminopropyltrimethoxysilane | 2.39 |
| C - 2 | N-(2-aminoethyl)-3-aminopropyltrimethoxysilane | 13.60 |
| 6 | N-(n-butyl)-aminopropyltrimethoxysilane | 2.01 |
| C - 3 | N-(2-aminoethyl)-3-aminopropyltrimethoxysilane | 14.57 |
| 7 | N-(n-butyl)-aminopropyltrimethoxysilane | 4.11 |
| C - 4 | N-(2-aminoethyl)-3-aminopropyltrimethoxysilane | 12.04 |
| 8 | N-(n-butyl)-aminopropyltrimethoxysilane | 2.54 |
| C - 5 | N-(2-aminoethyl)-3-aminopropyltrimethoxysilane | 14.49 |
| 9 | N-(n-butyl)-aminopropyltrimethoxysilane | 1.31 |
| C - 6 | N-(2-aminoethyl)-3-aminopropyltrimethoxysilane | 11.32 |
| 10 | N-(n-butyl)-aminopropyltrimethoxysilane | 2.33 |
| C - 7 | N-(2-aminoethyl)-3-aminopropyltrimethoxysilane | 15.86 |
| 11 | N-(n-butyl)-aminopropyltrimethoxysilane | 1.72 |
| C - 8 | N-(2-aminoethyl)-3-aminopropyltrimethoxysilane | 13.51 |

A comparison of the results in Table 4 immediately shows that the comparative recording sheets C-1 to C-8 show much stronger box yellowing than the recording sheets 1 to 15 according to the invention. The comparisons were made for the cases where the same type of fumed silicium dioxide and the same metal salt were used.

Finally, variations from the examples given herein are possible in view of the above disclosure. Therefore, although the invention has been described with reference to certain preferred embodiments, it will be appreciated that other binders may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:

1. Recording sheet for ink jet printing having coated onto a support at least one ink-receiving layer consisting of at least one binder and at least one dispersion of surface modified silicium dioxide, wherein the surface of the silicium dioxide consists of the reaction products of at least one compound of trivalent aluminum and/or tetravalent zirconium with at least one aminoorganosilane, wherein the aminoorganosilane is selected from the group consisting of N-(ethyl)-aminoisobutyltrimethoxysilane and N-(cyclohexyl)-aminomethyltriethoxysilane or mixtures thereof;

and wherein
a layer of 1 cm thickness of an aqueous solution, prepared at room temperature, of 0.01 moles of aluminum chlorohydrate, 0.02/k moles of aminoorganosilane or a mixture of aminoorganosilanes, 0.01 moles of hydrochloric acid and 0.02 moles of glyoxal, having a final weight of 200 g, and stored for 24 hours at room temperature, shows an absorption increase of less than 0.05 at a wavelength of 400 nm after storage, wherein k is the number of amino groups of the aminoorganosilane or a mean value of the numbers of amino groups of the individual aminoorganosilanes in the mixture of aminoorganosilanes.

2. Recording sheet for ink jet printing according to claim 1, wherein the binder is selected from the group consisting of polyvinyl alcohol, gelatin, derivatives of polyvinyl alcohol, polyvinylpyrrolidone or mixtures of these compounds.

3. Recording sheet for ink jet printing according to claim 1, wherein the recording sheet is hardened with boric acid.

4. Recording sheet for ink jet printing according to claim 1, wherein the recording sheet contains a plurality of ink-receiving layers.

5. Recording sheet for ink jet printing according to claim 4, wherein each ink-receiving layer contains a fumed silicium dioxide having a different specific surface area.

6. Recording sheet for ink jet printing according to claim 4, wherein the silicium dioxide used in the different layers has been differently modified with the reaction products of at least one compound of trivalent aluminum and/or tetravalent zirconium with at least one aminoorganosilane and wherein a layer of 1 cm thickness of an aqueous solution, prepared at room temperature, of 0.01 moles of aluminum chlorohydrate, 0.02/k moles of aminoorganosilane or a mixture of aminoorganosilanes, 0.01 moles of hydrochloric acid and 0.02 moles of glyoxal, having a final weight of 200 g, and stored for 24 hours at room temperature, shows an absorption increase of less than 0.05 at a wavelength of 400 nm after storage, wherein k is the number of amino groups of the aminoorganosilane or a mean value of the numbers of amino groups of the individual aminoorganosilanes in the mixture of aminoorganosilanes.

7. Recording sheet for ink jet printing according to claim 4, wherein the different ink-receiving layers have a different ratio of binder to silicium dioxide.

8. Recording sheet for ink jet printing according to claim 4, wherein the different ink-receiving layers are hardened with different amounts of boric acid.

9. Recording sheet for ink jet printing according to claim 1, wherein the support is selected from the group consisting of coated or uncoated paper, transparent or opaque polyester or polypropylene and fibrous textile materials.

10. Recording sheet for ink jet printing according to claim 1, wherein the recording sheet is manufactured by extrusion coating, air knife coating, doctor blade coating, cascade coating or curtain coating.

11. Recording sheet for ink jet printing according to claim 1, wherein the compound of trivalent aluminum is selected from the group consisting of aluminum chloride, aluminum nitrate, aluminum acetate, aluminum formiate, aluminum lactate, aluminum chlorohydrate or mixtures of these compounds.

12. Recording sheet for ink jet printing according to claim 1, wherein the compound of tetravalent zirconium is zirconyl chloride.

13. Recording sheet for ink jet printing according to claim 1, wherein the silicium dioxide is fumed silicium dioxide.

14. Recording sheet for ink jet printing according to claim 13, wherein the fumed silicium dioxide has a specific surface area between 20 $m^2/g$ and 400 $m^2/g$.

15. Recording sheet for ink jet printing according to claim 1, wherein the amount of the compound of trivalent aluminum and/or tetravalent zirconium is from 0.1 to 20 percent by weight relative to the amount of silicium dioxide.

* * * * *